May 12, 1970     J. A. VIETORISZ     3,511,262

FLUID COOLED VALVE

Filed Nov. 14, 1966     4 Sheets-Sheet 1

INVENTOR.
JOSEPH A. VIETORISZ

BY Sherman H Barker
his Attorney

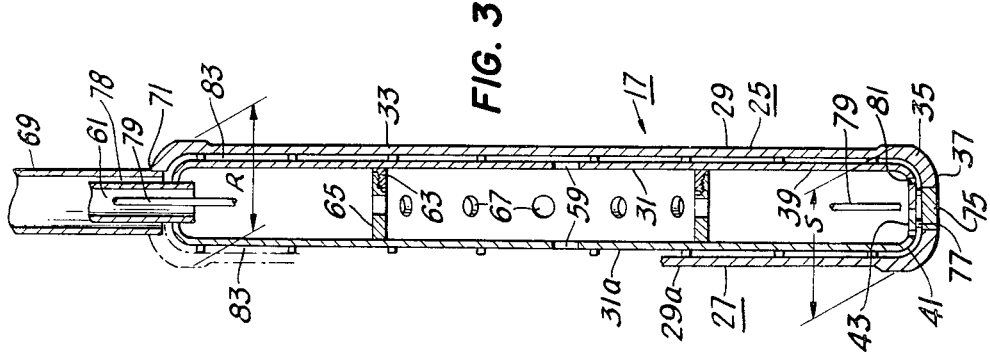
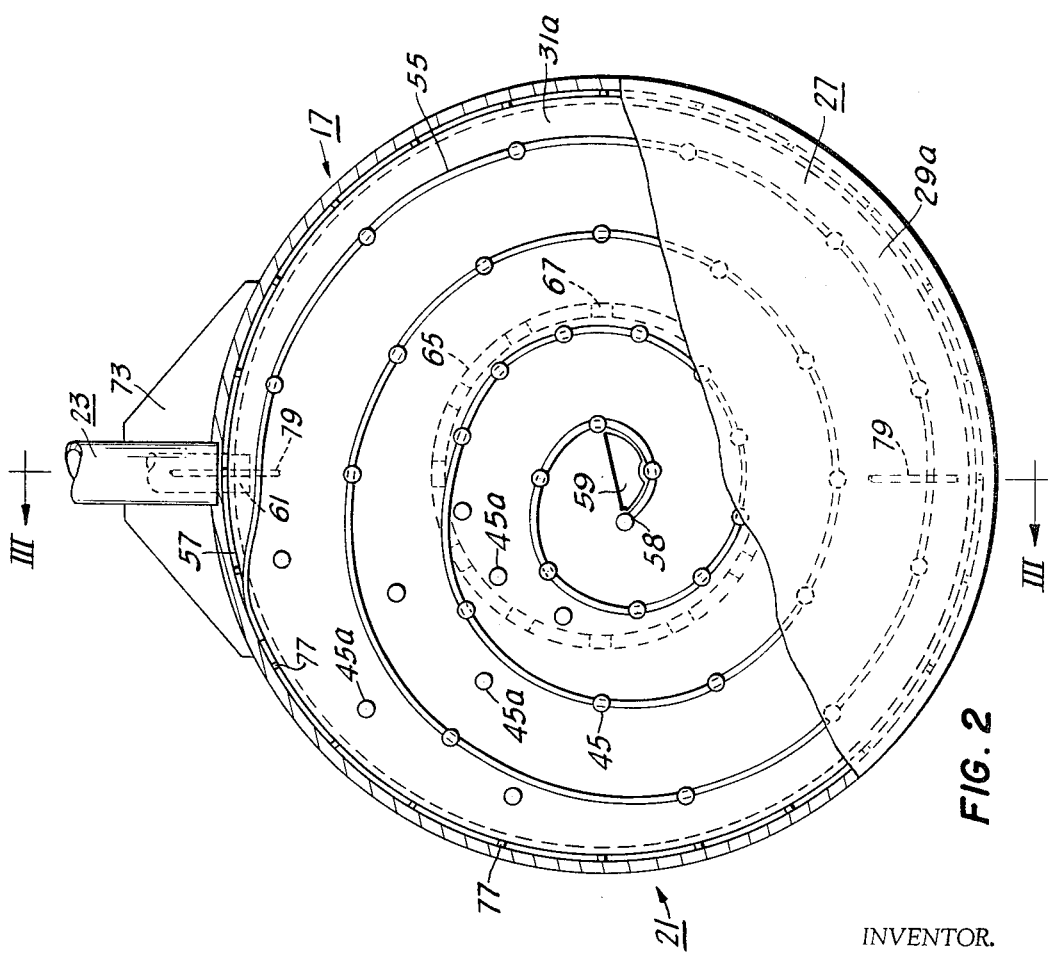

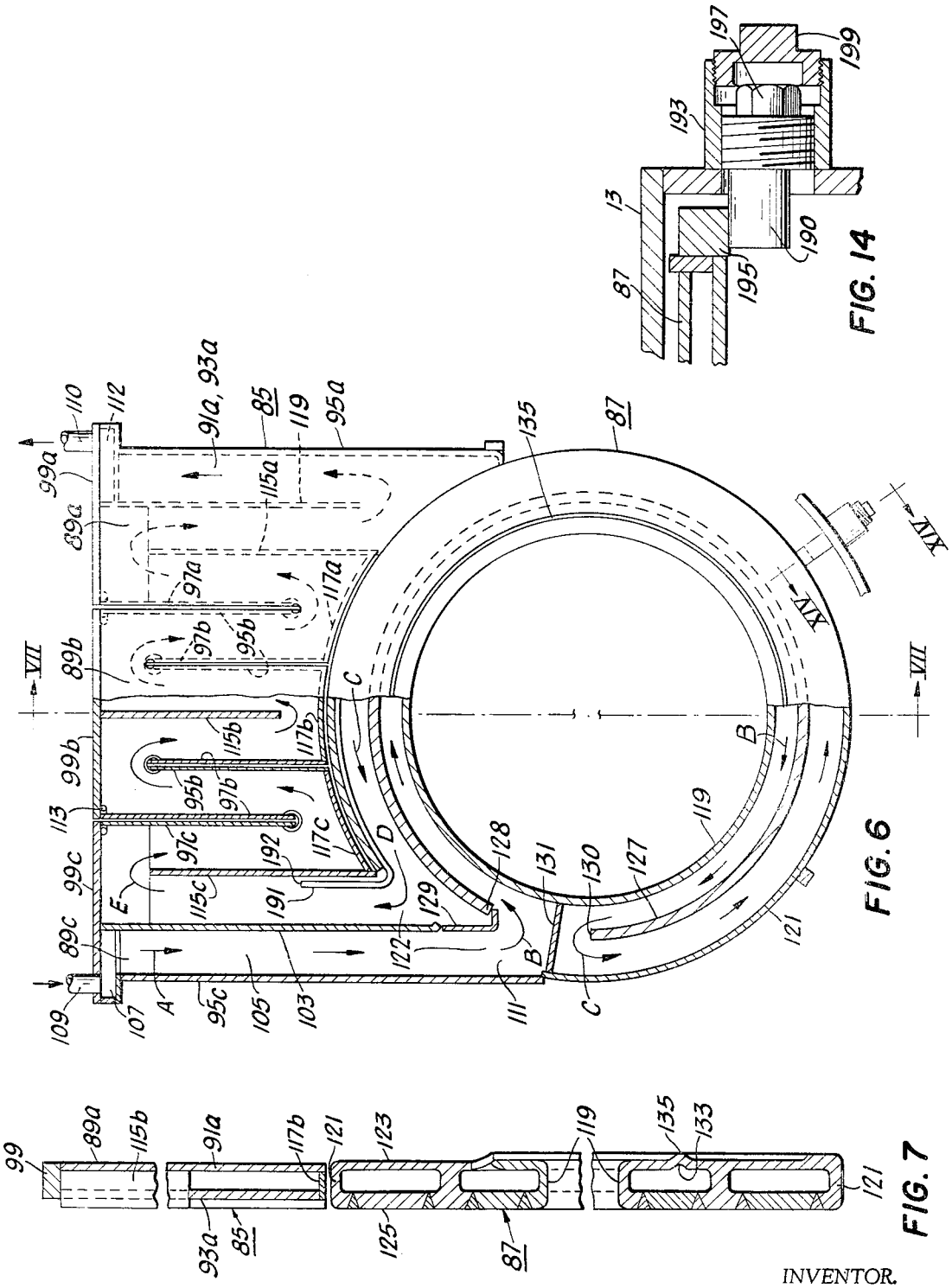

May 12, 1970 J. A. VIETORISZ 3,511,262
FLUID COOLED VALVE
Filed Nov. 14, 1966 4 Sheets-Sheet 4
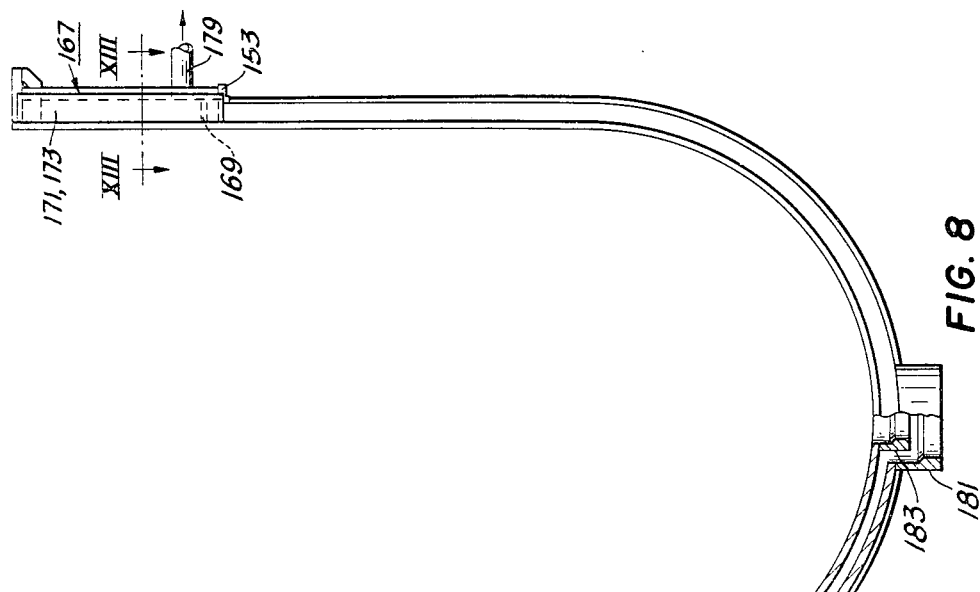
FIG. 8
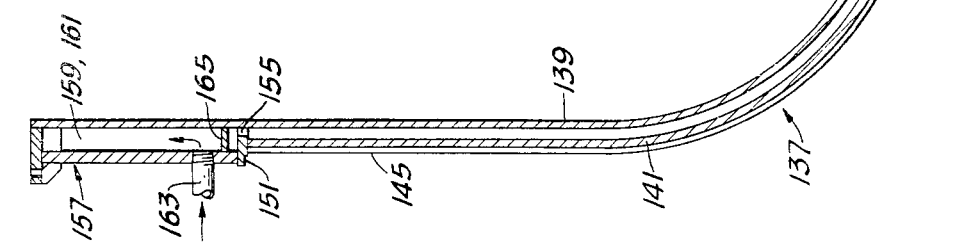
FIG. 9
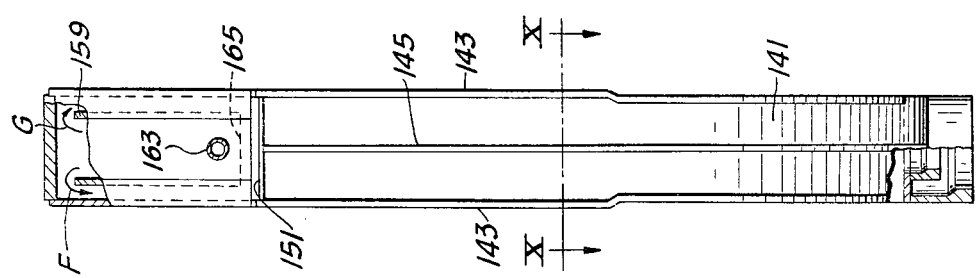
FIG. 10
INVENTOR.
JOSEPH A. VIETORISZ
BY 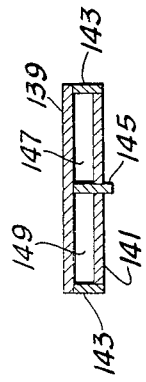
his Attorney United States Patent Office 3,511,262
Patented May 12, 1970

3,511,262
FLUID COOLED VALVE
Joseph A. Vietorisz, Pittsburgh, Pa., assignor to Koppers Company, Inc., a corporation of Delaware
Filed Nov. 14, 1966, Ser. No. 594,058
Int. Cl. F16k 49/00
U.S. Cl. 137—315                           9 Claims

ABSTRACT OF THE DISCLOSURE

A valve for handling very hot gaseous fluid is protected against radiation exposure and against direct contact with such hot gaseous fluid by means of removable, water-cooled panels that form part of the valve seat, and a water-cooled U-panel located within the valve housing and between the valve seats. Such panels may be readily removed and replaced without having to remove the valve proper while it is in service.

---

This invention relates to valves and, more particularly, to an improved valve of the gate-valve type for use as a hot blast valve with blast furnaces, or wherever the temperature of a fluid passing through such a valve is relatively high.

Hot blast valves are used to control the flow of hot air from a stove to the hot blast main leading to the blast furnace bustle pipe.

Recently, with the use of beneficiated burdens, moisture and fuel injection, it became possible to utilize higher blast temperatures which result in substantial coke saving. However, these higher blast temperatures created many problems. Gate valves, for instance, which are used for hot blast valves, had to be redesigned. Originally only the gates and seats were water cooled. For 2000° F. blast temperature the valve body must also be cooled and the gates and seats provided with a higher velocity of water. Even with these improved designs the hot blast valves require close attention because of water leaks and distortions due to hot spots. Maintenance became of major importance, and hot blast valves are now offered which can be serviced without removing the valve body from the main pipe line.

Recognizing the fact that in a hot blast valve or in any valve servicing high temperature fluids, most of the trouble can be eliminated if thermal movements are put under control and minimized, and excessive stress accumulations are prevented, the valve design was changed in separating the heat and pressure loads on the body shell, also the gate was shaped in a novel way to suit the trend of ever increasing blast temperatures.

In accordance with the present invention a valve, designed for handling very hot gaseous fluid, has a body shell that has no integral conduits around the gate for cooling purpose; instead, it is protected against radiation exposure and against direct contact with the hot blast air by means of water cooled removable panels that form part of the valve seat, and a water cooled U-panel within the valve housing and between the valve seats. Such water cooled panels may be readily removed and replacement parts installed without having to remove the entire valve assembly from the hot blast service conduit.

For a further understanding of the present invention, and for advantages and features thereof, reference may be made to the following description taken in conjunction with the accompanying drawings which show, for purposes of exemplification, a preferred embodiment of the invention.

In the drawings:

FIG. 2 is a schematic elevational view, partly in section, of the valve disc of FIG. 1;

FIG. 3 is a schematic sectional view along line III—III of FIG. 2;

FIG. 6 is a view along line VI—VI of FIG. 1 of the valve seat, partly in section;

FIG. 7 is a sectional view, at an enlarged scale, along line VII—VII of FIG. 6;

FIG. 8 is a view, partly in section, of the U-panel portion of the valve of FIG. 1;

FIG. 9 is a side view, partly in section, of the U-panel of FIG. 8;

FIG. 10 is a sectional view along line X—X of FIG. 9;

FIG. 14 is a sectional view along line XIV—XIV of FIG. 6.

Figure 1:
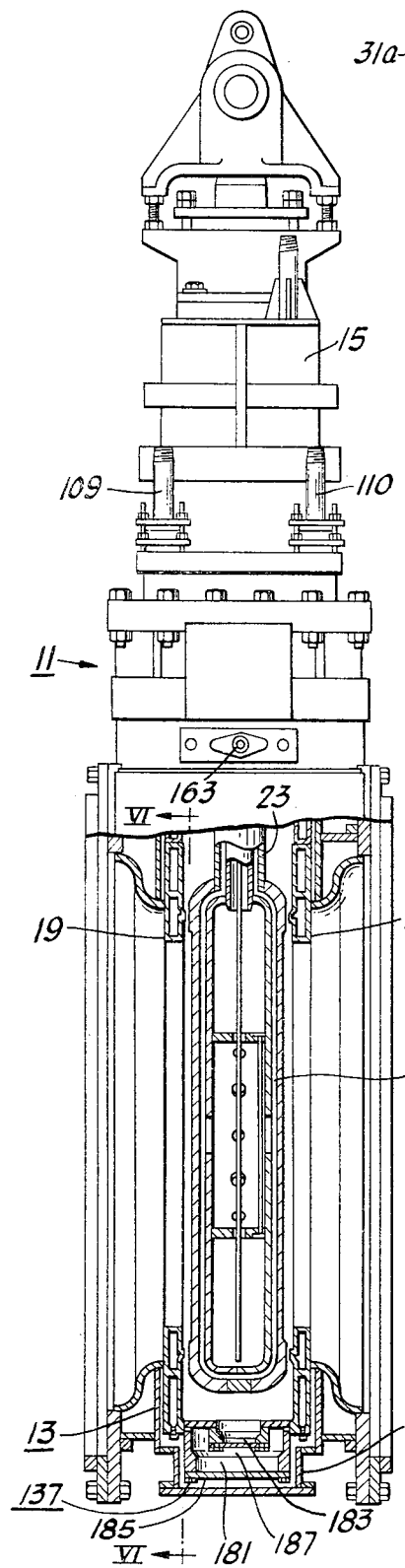
FIG. 1 is a schematic side elevational view, partly in section of an embodiment of a gate-type valve, such as a hot blast valve, made in accordance with the invention.

The valve 11 of FIG. 1 includes: a valve housing 13; a valve bonnet 15 mounted on the valve housing 13; a valve disc 17 movable within the valve housing 13 and sealingly engageable with valve seats 19 that are fixed within the housing 13.

The valve disc 17, FIG. 2, includes a main body portion 21 and a valve stem 23 mounted to the valve disc 17. Basically, the valve disc main body portion 21 comprises substantially identical first and second half-discs 25, 27 (FIG. 3); the first half-disc 25 including an outer circular shaped shell 29, and a generally concentric inner circular-shaped shell 31 (FIG. 3). The second half-disc 27 includes, likewise, an outer circular-shaped shell 29a and a generally concentric inner circular-shaped shell 31a. Both of the outer circular-shaped shells 29, 29a are preferably, conventional flanged-only steel heads. Each shell 29, 29a has a central flat portion 33, and each shell also has a conventional knuckle portion 35 that merges into a straight flange portion 37, substantially perpendicular to the flat portion 33. Purposely, the flat portion 33 is thinner than the knuckle portion 35 and the flange portion 37 for a reason that will be explained hereinafter.

The inner shells 31, 31a are also preferably conventional flanged-only steel heads that are, likewise, comprised of a flat plate portion 39, a knuckle portion 41, and a straight flanged portion 43. The inner shells 31, 31a are, respectively slightly smaller in diameter than the outer shells 29, 29a so that each inner shell 31, 31a nests within a respective outer shell 29, 29a, in substantially uniformly spaced apart relation, forming a fluid flow spaces 83 between the adjacent shells 29, 29a and 31, 31a.

Figure 5:
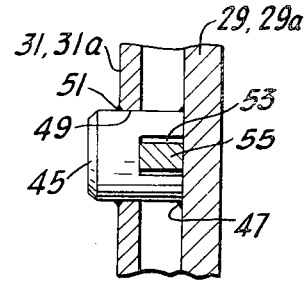
FIG. 5 is a detail, at an enlarged scale, of another portion of the structure of FIG. 2.

FIG. 5 illustrates a preferred manner for maintaining the inner 31 and outer 29 shells in a concentric uniformly spaced apart relation. At a number of selected, spaced-apart locations on the surfaces of the inner 31 and the outer 29 shells, such locations being generally in opposite registration on both shells, studs 45 are welded as at 47 (FIG. 5), to the outer shells 29, 29a so that the studs 45 project through holes 49 of matching size in the inner shells 31, 31a. As shown in FIG. 5, the studs 45 are also welded, as at 51, to the inner shells 31, 31a.

Most, but not all, of the studs 45 are provided with a groove 53 at the end that is welded to the outer shells 29, 29a. The other studs 45a (FIG. 2) are welded to both the outer shells 29, 29a and inner 31, 31a shells, but do not have a groove 53. Those studs which have the groove 53 straddle a water flow vane bar 55 that engages the stud and inner surface of the outer shells 29, 29a.

Each vane bar 55, however, is free to expand when heated in a linear direction along its length. As shown in FIG. 2, each vane bar 55 is formed in the shape of a spiral. Each vane bar 55 terminates at one end at a location 57 on the periphery of the inner shells 31, 31a, and terminates at the other end 58 at one of the studs 45 and alongside of a segmental shaped aperture 59 in the central region of the inner shells 31, 31a. The vane bars 55 are fixed at the terminal locations 57 by welding, but are not fixed at the other end 58. Thus, the vane bars 55 when heated are free to expand in a longitudinal direction along the longitudinal spiral path, and they offer no resistance to the thermal expansion and contraction of the shells 29, 29a and 31, 31a. The studs 45a, it will be understood, serve to maintain in spaced apart relation the larger areas of the outer 29, 29a and inner 31, 31a shells between adjacent convolutions of the spiral vane bar 55. In another sense, the ungrooved studs 45a lie generally on concentric circular arcs between adjacent convolutions of the spiral vane bar 55.

The upper portion of the vane bar 55 is bent slightly arcuately near the terminus 57 to avoid the end of a cooling water discharge conduit 61, which is preferably welded to the inner shells 31, 31a and which projects within the interior of the valve disc in the space between the inner shells 31, 31a. The arcuate upper portion of the vane bar 55 also provides guidance for the cooling water supplied through conduit 69.

Figure 4:
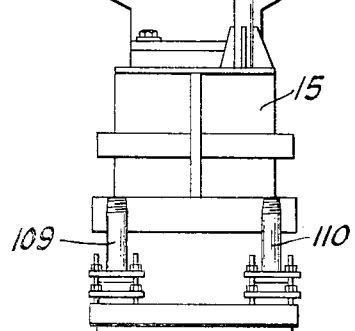
FIG. 4 is a detail, at an enlarged scale, of a portion of the structure of FIG. 3.

To the inner surfaces of the inner shells 31, 31a, there are welded cylindrical tubes 63, 65 respectively that are threaded respectively externally and internally, as shown in FIG. 4. The cylindrical tube 65 is also provided with a plurality of spaced apart apertures 67, and the respective cylindrical tubes 63, 65 are located concentrically with respect to the inner shells 31, 31a, as shown in FIG. 2.

The cooling water outlet conduit 61 is disposed generally concentrically within the valve disc stem 23 which also serves as a cooling water inlet conduit. The hollow fluid-conducting valve stem 23 is disposed in a suitable aperture 71 in the outer shells 29, 29a, and is welded thereto to provide a fluid seal. Preferably, the fluid-conducting valve stem 23 is supported against lateral movement relative to the valve disc 17 by suitable brackets 73 (FIG. 2) that are welded to the valve stem 23 and to the valve disc 17.

To assembly the valve disc 17, it is necessary to fabricate the first half-disc comprising the outer 29 and the inner 31 shells, including a plurality of studs 45, 45a, the vane flow bar 55, and the cylindrical tube 63. Likewise, the other half-disc, comprising the outer 29a and the inner 31a shells including studs 45, 45a, vane flow bar 55, and cylindrical tube 65, is also fabricated. Then, the two half-discs 25, 27 are so placed in edge facing relation that the internally and externally threaded tubes 63, 65 may be threadedly connected, as shown in FIG. 3. Conveniently, one of the half-disc assemblies is rotated relative to the other so that the tubes 63, 65 make a threaded connection, and the flanges 43 of the respective inner shells 31, 31a becomes contiguous in an abutting relation. The abutting flange edges of the inner shells 31, 31a may then be welded, and the water cooling conduit 61 may be inserted into a hole previously formed in the inner shells 31, 31a and welded in position.

It will be apparent that, when the half-discs 25, 27 are mated as described above, the flanges 37 of the outer shells 33, 33a do not abut. Purposely, a gap exists between the outer flanges that is wide enough to perform the welding of the inner flanges 43 that is required. After the welding of the inner flanges 43, however, the gap between the outer flanges 37 may be readily closed by inserting therein a filler piece 75. Preferably, the filler piece is a cylindrical ring, having an outer diameter that is substantially the same as the outer diameter of the outer shells 29, 29a, a thickness substantially equal to the thickness of the flange portions 37 of the shells, and a width equal to the width of the gap between the outer flanges 37. The filler piece 75 is supported, in spaced apart relation to the inner flanges 43, by means of a plurality of pairs of cylindrical spacer bars 77 that are uniformly angularly disposed around the periphery of the valve disc 17 (FIGS. 2 and 3).

In operation, cooling water flows through the valve stem 23 into the annulus space 78 around the discharge conduit 61, and enters the valve disc cooling fluid flow space 83 between the inner and outer shells 29, 29a, and 31 31a respectively. The water is guided in a spiral flow path by the vane bars 55 in the cooling fluid flow spaces 83 and finally leaves the cooling fluid flow spaces 83 by way of apertures 59 that are provided in a central location in both of the inner shells 31 and 31a. The water flowing through the apertures 59 enters the inner chamber of the valve disc, flows through the apertures in the tube 65 and out of the inner chamber by way of the discharge conduit 61.

To adequately drain the cooling fluid from the inner chamber of the valve disc 17, and from the cooling fluid flow spaces 83, there is provided a conventional siphon tube or conduit 79 that extends centrally vertically within the cooling fluid outlet conduit 61 through the holes 67 in the cylindrical tube 65, and terminates near the bottom of the inner chamber, as shown in FIG. 3. Adjacent the lower end of the siphon tube 79, there are a pair of relatively small drain holes 81 through the flange portion 43 of the inner shells 31, 31a and through which water flows from the fluid flow spaces 83 into the interior of the valve disc. The size of the holes 81 are preferably small so that, in operation, a large amount of water will not flow from the fluid flow spaces 83 through them.

In constructing the valve disc 17, it is desirable to provide a slight convergent taper in the vertical downward direction so that the valve disc 17 may provide a tight sealing engagement with one of the valve seats 19 when slightly swinging toward the side of lesser pressure. For this reason, the width or thickness R of the valve disc 17 at the top is slightly greater than the width, S, of the valve disc 17 at the bottom.

In fabricating the valve disc 17 from conventional flanged-only steel heads, it is desirable to remove some of the metal from the central portion 33, thereby reducing the thickness of the metal in this area, to provide better heat transfer from the metal to the cooling water flowing in the fluid flow spaces 83.

The valve housing 13 and valve bonnet are adapted to receive the hereinafter described valve seat 19 and valve disc 17.

Associated with the valve disc 17 described herein, are the valve seats 19 that exist as two spaced apart entities, only one of which needs description since both of them are substantially identical. As shown in FIG. 1, the valve seats 19 are mounted in the valve housing 13 and on opposite sides of the valve disc 17.

Referring to FIGS. 6 and 7, each valve seat comprises an upper portion 85 and a lower portion 87, both of which are connected so that cooling fluid such as water circulates through both the upper 85 and lower 87 portions in the manner disclosed herein.

Figure 11:
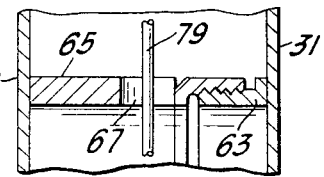
FIGS. 11-13 show details of construction of the valve of FIG. 1.

The upper portion 85 is comprised of three fluidly interconnected panel sections 89a, 89b and 89c. Panel section 89a is comprised of spaced apart inner and outer (as related to the position of the valve seat 19 in the valve assembly 11) parallel walls 91a, 93a and end walls 95a, 97a; the four walls being welded to a top closure plate 99a. The end wall 95a, as shown in FIG. 6, abuts and is welded to the lower valve seat portions 87, but the opposite end wall 97a is shorter in length and is spaced apart from the lower portion 87 to form a fluid passage within the panel section. The end wall 97a is spaced apart a small distance from an adjacent corresponding end wall 95b of the panel section 89b, and the lower ends of the adjacent end walls 97a, 95b are both sealingly capped by a split length of pipe 101 (FIG. 11) which is welded thereto as well as to the inner and outer walls 91a, 93a respectively.

It is to be noted that the center panel section 89b is made up of four compartments each having similar spaced apart inner 91b and outer 93b walls, as well as similar end walls 95b, 97b. The extreme end wall 95b of panel section 89b, that is adjacent end wall 97a, and the extreme end wall 97b, that is adjacent end wall 97c of panel section 89c, as well as the inner and outer walls 91b, 93b, are also welded to a top closure plate 99b. Intermediate the extreme end walls 95b, 97b are pairs of adjacent spaced apart walls 95b, 97b that are similar to the spaced apart walls 97a, 95b described hereinbefore and that form fluid flow baffles within the center panel section 89b.

The other panel section 89c which has four side walls 91c, 93c, 95c, and 97c, that are welded to the top closure plate 99c, is similar to the panel section 89a except that, adjacent the end wall 95c, there is a spaced parallel vertical internal wall 103 that is practically coextensive with and that forms with the end wall 95c a fluid inlet flow channel 105 leading from a reservoir 107 at the top of panel section 89c into which cooling fluid flows through an inlet conduit 109. The channel 105 communicates with the lower valve seat portion 87 through an opening 111 which will be referred to again hereinafter. An outlet conduit 110 communicates with a reservoir 112 at the top of the panel section 89a.

Figure 12:
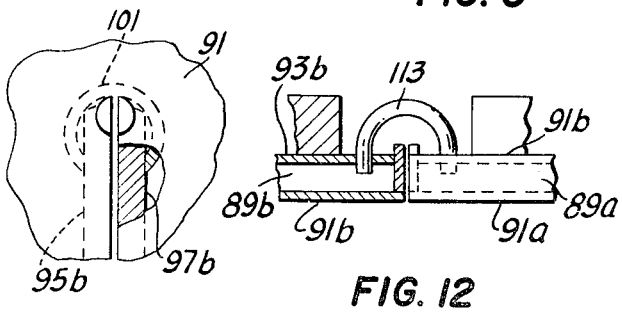

At the top of the three panel sections 89a, 89b, 89c there are lengths of U-shaped tubes 113 (FIG. 12) that intercommunicate the panel sections 89a, 89b, and 89c. These U-shaped tubes 113 may serve as both air and fluid flow tubes, but principally they serve as air vent tubes.

In the panel sections 89a, 89b, and 89c there are vertical internal baffles 115a, 115b and 115c respectively that provide, with the end walls 95, 97 of each respective panel section, a labyrinth fluid flow arrangement. An additional internal baffle 119 is located in spaced parallel relation to the end wall 95a within the panel section 85a and thereby forms the exit fluid flow passage from the upper portion of the seat ring 85.

Additionally, the lower edges of a portion of the panel sections 89a and 89c are closed by arcuate plates 117a, 117c extending from the internal baffles 115a, 115c to the respective near end wall 97b in panel section 89a and 95b in panel section 89c, while a similar arcuate plate 117b closes the bottom of the panel section 89b.

The lower valve seat ring 87 is hollow and comprised of concentric inner 119 and outer 121 circular bands that are integrally formed with inner and annularly shaped outer cover plates 123, 125 (FIG. 7). The outer circular band 121 is not completely closed and terminates at the upper end at the baffle 115c to which it is welded, and at the lower end at the side wall 95c to which it is welded. The break in the continuity of the outer circular band 121 thus forms the fluid inlet 111 and outlet 122 passageways, through which fluid flowing in the upper seat ring portion 85 enters and exits the lower portion 87 in the manner described hereinafter.

Within the hollow lower valve seat ring 87 there is a circular baffle plate 127 that is uniformly spaced apart from both the inner 119 and outer 121 circular bands. However, the baffle plate 127 is not completely closed and terminates at the upper end 128 in a connection to an extension 129 of the internal wall 103, while the other end 130 of the baffle plate 127 simply terminates in spaced apart relation to the upper end. Intermediate the ends of the circular baffle plate 127, there is a radial baffle plate 131.

The surface of the inner cover plate 123 is dished slightly, as at 133, to provide a raised edge 135 on the outer surface of the plate 123. This raised edge is circular and is shaped to form a seat surface that mates with the valve disc 17.

The upper 85 and lower 87 valve seat ring portions are interconnected by welding, as at the intersection of the outer circular band 121 to the end wall 95c and the baffle plate 115c; and the end wall 95a to the outer circular band 121. There is no connection, however, between the outer circular band 121 and the arcuate bottom closure plate 117b.

Additionally, the valve 11 of the present invention includes a hollow heat shield or U-panel 137, shown in FIGS. 8–10. Such U-panel 137 includes: spaced apart parallel and concentric inner and outer U-shaped plate members 139, 141 respectively; U-shaped end plates 143 (FIG. 10); and a central baffle plate 145; such elements collectively forming spaced apart internal flow passages 147, 149. The upper ends of the inner 139 and outer 141 spaced apart plates connect to top closure plates 151, 153 that have therein apertures 155 on opposite sides of the baffle plate 145.

Figure 13:
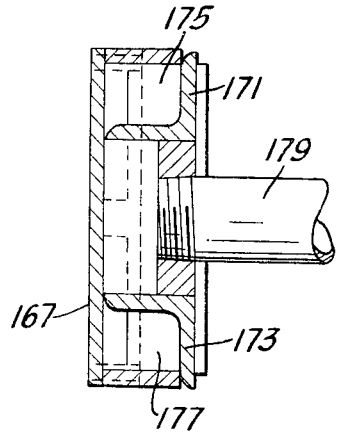

Supported on the top closure plate 151 is a rectangular fluid tank 157 that is internally vertically baffled, as at 159, 161 (FIG. 9), and that communicates with a fluid inlet conduit 163 centrally located above a horizontal baffle plate 165 extending between the side baffle plates 159, 161. A similar rectangular fluid tank 167 is supported on the top closure plate 153 and also has therein a horizontal baffle plate 169. The fluid tank 167 is, likewise, also vertically internally baffled by the legs of angle members 171, 173 into two internal fluid-flow side passages 175, 177, and a fluid outlet conduit 179 is connected in fluid communication with the central portion of the fluid tank 167, as shown in FIG. 13. At the bottom of the U-panel 137 there are provided coaxial openings 181, 183 in the inner 139 and outer 141 U-plates that permit access to the fluid flow passage 147, 149, as well as access into the interior of the valve housing 13 (FIG. 1). The access openings 181, 183 are provided with bolted cover plates 185, 187 respectively. Overall, there is a coaxial covered access opening 189 in the valve housing 13 (FIG. 1).

In operation the valve seat 19 is fluidly cooled by water flowing thereinto through the inlet conduit 109 and out of the valve seat 19 through the outlet conduit 110. Within the valve seat, the fluid flows downward in the flow channel 105 through the opening 111 and thence into the annulus between the circular baffle 127 and the inner circular band 119, in the direction of the arrows A and B. The fluid flow then proceeds generally in the direction of the arrows C and D in the lower valve seat portion 87 and upwardly thence into the upper valve seat portion 85. Therein the fluid flows in the direction indicated by the arrows E, until it emerges from the conduit, 110.

In like manner, cooling fluid, introduced into the U-panel 137 through the inlet conduit 163, flow upwardly in the central portion of the tank 157 and over the baffles 159, 161 as shown by the arrows F and G (FIG. 9). Thence, the fluid flows downward in the flow passages 147, 149 and upward into the lower portion of the tank 167. The baffle 169 diverts the fluid flow upward in the two side fluid flow channels 157, 177 (FIG. 13) from which the fluid flows downward in the central portion of the fluid tank 167 and then out of the fluid tank 167 through the conduit 179.

An air vent tube 191 (FIG. 6) is provided in each valve seat 19 to remove air from the top region of the lower valve portion 87; the tube 191 terminating at a convenient end location 192 with the upper valve seat portion 85 which above the highest point within the lower portion of the valve seat 87. Thus, air can vent from lower valve seat portion 87 up to the top of the upper seat portion 85.

The valve seat ring panels 85, 87 are adjustably held in place by means of a plurality of eccentric pin-type cams 190, only one of which is shown, each being mounted in a tubular projection 193 that is welded to the valve housing 13 (FIGS. 6, 14). The eccentric pin-type cam 190 is disposed to engage a lug 195, welded to the valve seat ring panel 87, when the pin-type cam 190 (FIG. 14) is rotated by the application of a suitable tool to the hexagon head 197 of the cam extending outside of the valve housing 13. The pin portion of the cam urges and maintains the valve seat panels 85, 87 in position against the valve housing 13. The eccentric cams 190 also are gas tightly sealed in the tubular projection 193, and the projecting tube 193 is closed by a conventional pipe plug 199.

It will be appreciated by those skilled in the art that the valve of the present invention has several features and advantages. One feature is that both the inner and outer shells of the valve disc are conventional flanged-only steel heads, such as are commercially available, and, it is not necessary to provide or fabricate elaborate castings or weldments to construct the valve disc.

Another feature is that the half-discs 25, 27 are considerably less expensive than castings or weldments, and are readily and easily assembled simply by threading their respective cylindrical portions 63, 65 together. These novel features and advantages make it possible to assemble the valve disc 17 in a considerably shorter time and more effesticely than otherwise would be possible.

Another feature of the valve disc is the inner shells 31, 31a are threadedly and securely connected together in the central region where the heat of service is apt to cause the greatest expansion of the shells. Another feature of the valve disc is that the surfaces, exposed to the greatest radiant heat with valve in closed position, are symmetrical about the centerpoint, and they are free from welds or other local restraints which could cause unaccounted for stresses and/or distortions. Another feature of the valve disc is that the studs 45 serve not only to maintain the inner and outer shells in spaced apart relation, but also to support and guide the vane flow bar 55 when it moves relative to the inner disc 31, 31a due to terminal expansion or contraction. The studs 45, in combination with the other studs 45a, moreover, serve to support and maintain the reduced thickness portion of the shells 33 in a substantially planar manner when subjected to relatively high internal water pressure.

A feature of the valve is that the valve housing is fully protected from the heat of the gases passing through the valve by the spaced apart fluid cooled valve seat panels, the fluid cooled valve disc, and the fluid cooled U-panel. The valve housing is thereby subjected to internal pressure only, and it is relieved from local thermal distortions and from the danger of leakage. Each of these fluid cooled elements is distinct and separate from the valve housing and each fluid cooled element may be removed from the valve housing without having to remove the valve from a hot blast valve line in which it may be located. Thus, a minimum of heat reaches the valve housing from the hot waste gases passing through the valve.

A feature of the valve of the invention is the eccentric cams which urge and maintain the valve seat panels in position. These cams may be adjusted from a position external to the valve housing so that a valve seat or seats may be adjusted while the valve is "on the line."

A feature of the valve is that all of the fluid cooled elements can move slightly as a result of thermal expansion without warping or doing damage to an adjacent element such as may be caused by warping. The upper panel sections of the valve seat are so made that thermal expansion in the horizontal direction is compensated for by the gap between the adjacent end walls of the respective sections.

What is claimed is:
1. In a gate valve, the improvement comprising:
 (a) a valve housing;
 (b) a valve disc in said housing;
 (c) valve seat members disposed in spaced apart relation in said valve housing, each valve seat member including
  (i) a first portion comprised of a hollow ring wherein there is a first cooling fluid passage, and
  (ii) a second portion comprised of a plurality of fluidly interconnected fluid containers with one of said fluid containers being fluidly connected to said first cooling fluid passage in said first portion, and
  (iii) conduit means to introduce cooling fluid into one of said fluid containers whereby said fluid courses a prescribed path in said first and second portions thereby cooling the valve seat member, and
  (iv) conduit means through which said cooling fluid flows out of said valve seat; and
 (d) a heat shield member comprising
  (i) fluidly interconnected fluid containers spaced between said valve seats and surrounding at least a portion of said valve disc,
  (ii) conduit means to introduce cooling fluid into such shield member, and
  (iii) conduit means through which said cooling fluid flows out of said shield member;
 (e) said valve disc being disposed between said valve seats and adapted for movement into seating arrangement with said valve seats whereupon passage of fluid through said valve is stopped, and adapted for movement to allow the passage of fluid through said valve, said valve disc comprising
  (i) first and second matching disc portions, with each such portion including spaced apart inner and outer shells and with each inner shell having an aperture therein,
  (ii) means for maintaining said inner and outer shells in spaced apart relation,
  (iii) means to guide fluid flowing in the space between adjacent shells along a path toward and through said aperture,
  (iv) a first threaded cylinder mounted to the inner shell of said first disc and having therein a plurality of apertures,
  (v) a second threaded cylinder mounted to the inner shell of said second disc, said first and second cylinders being concentric and threadedly engageable whereby when said first and second disc portions are threaded together, said first and second discs become edge abutting and form said valve disc,
  (vi) means to introduce cooling fluid into the space between said first and second disc portions whereby said fluid courses a prescribed fluid flow path therein and emerges therefrom through said apertures into the interior of said valve disc, and
  (vii) means to withdraw said cooling fluid from the interior of said valve disc.
2. The invention of claim 1 including:
 (a) cam means mounted in said valve housing and engageable with respective valve seats whereby, when said cams are actuated, said valve seat is positioned and maintained in said housing to sealingly engage said valve seat.
3. The invention of claim 2 wherein:
 (a) the means for maintaining the inner and outer shells of each of said valve discs in spaced apart relation are studs; and
 (b) said fluid guide means comprises a continuous bar positioned spirally between said inner and outer shells and supported by said studs.
4. The invention of claim 2 wherein:
 (a) said cam means are actuatable from outside of said valve housing; and
 (b) said cam means are sealingly gastight with respect to said valve housing.

5. In a gate valve having a valve disc within a housing for the control of the flow of a fluid, the improvement comprising:
   (a) spaced apart fluid-cooled valve seats disposed in said housing on opposite sides of said valve disc each said seat including spaced apart fluid-cooled panel members disposed in juxtaposed relation to a respective valve seat;
   (b) means fluidly interconnecting each fluid cooled panel to its respective valve seat; and
   (c) a fluid-cooled heat shield member disposed in said housing and between said valve seats and their respective panel members, said fluid-cooled shield member surrounding at least a portion of said valve disc, with each of said valve seats and their respective panel members, and said shield member being individually replaceable without having to remove said valve from a service position in a fluid conduit.

6. In a gate valve, a hollow valve disc comvprising:
   (a) first and second matching disc portions each comprising
      (i) spaced apart inner and outer shells forming therebetween a fluid flow space, said inner shell having therein an aperture, and
      (ii) means for maintaining said inner and outer shells in spaced apart relation, and
      (iii) means in said fluid flow space to direct fluid flowing therein along a prescribed path toward and through said aperture;
   (b) a first threaded cylinder mounted to the inner shell of said first disc portion;
   (c) a second threaded cylinder mounted to the inner shell of said second disc portion, said first and second cylinders being concentric and threadedly engaged with said first and second matching disc portions disposed in the edge abutting relation; and
   (d) means to introduce fluid into the fluid flow space of both said first and said second disc portions.

7. The invention of claim 6 wherein:
   (a) the means to direct fluid flowing in each said fluid flow space comprises a continuous bar that is adapted to move freely linearly within the annulus when said bar is heated.

8. The invention of claim 6 wherein:
   (a) the means for maintaining the inner and outer shells in spaced apart relation comprises a plurality of studs fixed to said inner and outer shells with a portion of the number of said studs engaging said bar and guiding the same as it moves linearly when heated.

9. In a gate valve, a hollow valve disc comprising:
   (a) first and second matching shaped members, each said member including
      (i) spaced apart inner and outer members forming therebetween a fluid flow space, and
      (ii) an aperture in each said inner member;
   (b) a threaded unit fixed to each said inner member so that when said units are threadedly engaged, said first and second shaped members are secured together in edge abutting relation forming a chamber within said valve disc;
   (c) a hollow valve stem communicating with said fluid flow space whereby cooling fluid, flowing in said valve stem, flows into said fluid flow space and thence into said chamber; and
   (d) a conduit disposed in said valve stem communicating with said chamber for removing cooling fluid therefrom.

References Cited
UNITED STATES PATENTS

| | | | |
|---|---|---|---|
| 3,207,174 | 9/1965 | Berczynski | 137—340 X |
| 3,249,117 | 5/1966 | Edwarde | 137—315 |
| 1,070,693 | 8/1913 | Keiser | 137—340 |
| 1,102,197 | 6/1914 | Knox | 137—340 |
| 2,467,945 | 4/1949 | Pottmeyer | 137—340 |
| 2,331,465 | 10/1943 | Fox | 137—340 |
| 2,884,959 | 5/1959 | Neely | 137—340 X |
| 3,068,888 | 12/1962 | Mohr | 137—340 |
| 3,215,399 | 11/1965 | McInerney et al. | 251—327 X |

WALTER A. SCHEEL, Primary Examiner

J. P. McINTOSH, Assistant Examiner

U.S. Cl. X.R.

137—340